(12) United States Patent
Schook

(10) Patent No.: US 9,789,429 B2
(45) Date of Patent: Oct. 17, 2017

(54) PRE-SEPARATING VANE DIFFUSER AND METHOD FOR INTRODUCING A FLOW-MIXTURE IN A SEPARATOR

(75) Inventor: Robert Schook, Steenderen (NL)

(73) Assignee: Sulzer Chemtech AG, Winterthur (CH)

(*) Notice: Subject to any disclaimer, the term of this patent is extended or adjusted under 35 U.S.C. 154(b) by 875 days.

(21) Appl. No.: 13/394,942

(22) PCT Filed: Sep. 13, 2010

(86) PCT No.: PCT/NL2010/050582
§ 371 (c)(1),
(2), (4) Date: Feb. 14, 2013

(87) PCT Pub. No.: WO2011/031154
PCT Pub. Date: Mar. 17, 2011

(65) Prior Publication Data
US 2013/0139689 A1 Jun. 6, 2013

(30) Foreign Application Priority Data

Sep. 11, 2009 (NL) ...................................... 2003478

(51) Int. Cl.
| | | |
|---|---|---|
| *B01D 45/16* | (2006.01) | |
| *B01D 50/00* | (2006.01) | |
| *B01D 46/10* | (2006.01) | |
| *B01D 46/00* | (2006.01) | |
| *B01D 45/14* | (2006.01) | |
| *B01D 45/02* | (2006.01) | |
| *B01D 45/06* | (2006.01) | |

(52) U.S. Cl.
CPC ............. *B01D 45/16* (2013.01); *B01D 45/02* (2013.01); *B01D 45/06* (2013.01); *B01D 45/14* (2013.01); *B01D 46/003* (2013.01); *B01D 46/0045* (2013.01); *B01D 46/10* (2013.01); *B01D 50/002* (2013.01)

(58) Field of Classification Search
CPC ........ B01D 45/02; B01D 45/06; B01D 45/14; B01D 45/16; B01D 46/003; B01D 46/0045; B01D 46/10; B01D 50/002
See application file for complete search history.

(56) References Cited

U.S. PATENT DOCUMENTS

| | | | | |
|---|---|---|---|---|
| 2,182,862 A | * | 12/1939 | Allardice ............... | B01D 45/08 55/442 |
| 5,180,407 A | * | 1/1993 | DeMarco ........................ | 55/302 |
| 5,743,926 A | * | 4/1998 | Bannon et al. ................. | 55/396 |

(Continued)

FOREIGN PATENT DOCUMENTS

| | | |
|---|---|---|
| DE | 1519711 | 7/1970 |
| EP | 1588749 A1 | 10/2005 |
| GB | 1119699 | 7/1968 |

*Primary Examiner* — Amber R Orlando
*Assistant Examiner* — Britanny Precht
(74) *Attorney, Agent, or Firm* — Larson & Anderson, LLC

(57) ABSTRACT

The invention relates to a vane diffuser for separating a gas/liquid/particulate-mixture flow in a gas phase fraction and a liquid/particulate phase fraction, comprising: a distribution chamber holding a plurality of curved vanes and an inlet for the gas/liquid/particulate-mixture wherein the vane diffuser also comprises a cyclone pre-separator located before the distribution chamber. The invention also relates to a method for separating a gas/liquid/particulate-mixture.

10 Claims, 2 Drawing Sheets

(56) References Cited

U.S. PATENT DOCUMENTS

| | | | |
|---|---|---|---|
| 6,537,458 | B1 | 3/2003 | Polderman |
| 7,488,361 | B2 * | 2/2009 | Larnholm .............. B01D 45/16 55/318 |
| 8,991,622 | B2 * | 3/2015 | Schook .................. B01D 45/16 210/512.3 |
| 2001/0038156 | A1 | 11/2001 | Mcewan |
| 2003/0115843 | A1 * | 6/2003 | Haland .......................... 55/392 |
| 2005/0000200 | A1 | 1/2005 | Christiansen et al. |
| 2005/0011170 | A1 * | 1/2005 | Christiansen et al. .......... 55/345 |
| 2007/0044437 | A1 * | 3/2007 | Larnholm et al. .............. 55/319 |
| 2008/0168753 | A1 * | 7/2008 | Christiansen et al. .......... 55/440 |
| 2008/0251419 | A1 * | 10/2008 | Stein et al. .................. 208/106 |
| 2009/0078118 | A1 | 3/2009 | Kooijman |

* cited by examiner

PRE-SEPARATING VANE DIFFUSER AND METHOD FOR INTRODUCING A FLOW-MIXTURE IN A SEPARATOR

BACKGROUND OF THE INVENTION (1) Field of the Invention

The invention relates to a vane diffuser for separating a gas/liquid/particulate-mixture flow in essentially a gas phase fraction and a liquid/particulate phase fraction, comprising: a distribution chamber holding a plurality of curved vanes lancing the side walls of the distribution chamber, the side walls being provided with passages between the curved vanes connecting the interior of the distribution chamber with the outside; and an inlet for the gas/liquid/particulate-mixture connecting to the distribution chamber. The invention also relates a method for introducing a gas/liquid/particulate-mixture in a separator.

(2) Description of Related Art

Vane diffusers are known in the technology field of extraction of hydrocarbons (oil and gas). For the further processing of voluminous gas flows containing liquids (e.g. oil and water) and/or solid particulate material (e.g. sand) different phases are separated from each other. The separation is conducted in several steps of which at the start of the separation process a rough separation step is conducted by leading the gas/liquid/particulate-mixture in a large separator (vessel) that may be horizontal or vertical positioned. In the context of the present invention a gas/liquid/particulate-mixture flow is considered to be a gas flow containing at least one of both: liquid particles or solid particulate material. However normally the gas/liquid/particulate-mixture to be processed contains both liquid particles and solid particulate material.

The initial separation process in the separator is realised by gravity. Larger droplets and particles will fall down into a reservoir in the lower part of the separator and the gas with remaining (smaller) droplets and smaller solid particles will flow upwards into the separator to a so called "calm zone" or "settling zone". From the calm zone additional droplets and particles will fall down or flow down along the wall of the separator. The liquid and particles in the reservoir in the lower part of the separator will be extracted via a heavy fraction outlet located in the lower part of the separator while the gas (including still remaining droplets and particles) will be extracted on the upper side from the separator. Both the extracted (roughly separated) material fractions are normally further processed in different more thorough subsequent separation processes. It is also possible that one or more of such subsequent separation process steps also take place in the separator (e.g. by incorporating a coalescer in the upper part of the separator). The gas/liquid/particulate-mixture is normally introduced more or less at the middle of the separator through an inlet conduit. To distribute the gas/liquid/particulate-flow equally over the cross-section of the separator use is made of flow dividers like "baffle plates" and "vane diffusers". The prior art dividers function well but are however limited in their capacity; as in separators of the introductorily disclosed type the capacity of the flow dividers are the bottle neck. When a flow divider is overloaded the maximum allowable flow rates of gas is exceeded resulting in significant volumes of liquid and particles being drawn up to the upward zone of the separator.

A general object of the invention is to provide a vane diffusers and a method for introducing a gas/liquid/particulate-mixture in a separator for efficient pre-separation of the gas/liquid/particulate-mixture in essentially a light, essentially gas containing, fraction and a heavier, essentially a liquid and particles containing, fraction with higher separation efficiency than the prior art diffuser technique by enhancing the maximum load (maximum capacity) of the diffuser before being overloaded.

SUMMARY OF THE INVENTION

The present invention provides a vane diffuser of the introductorily stated type characterised in that such vane diffuser also comprises a cyclone pre-separator located between the inlet for the gas/liquid/particulate-mixture and the distribution chamber, which cyclone pre-separator comprises: a cyclone housing upstream connecting to the inlet for the gas/liquid/particulate-mixture; a swirl element for rotation of the gas/liquid/particulate-mixture flow being located in the cyclone housing downstream of the inlet for the gas/liquid/particulate-mixture; a gas phase outlet opened to the distribution chamber downstream of the swirl element; and a liquid phase outlet connecting to the outer zone of the cyclone housing downstream of the swirl element. The pre-separation of the single gas/liquid/particulate-mixture flow in the cyclone pre-separator into two different material fractions located in a central zone and an outer annular zone is realised by centrifugal separation; resulting in a lighter fraction containing less liquid and particles than the originally fed gas/liquid/particulate-mixture and a heavier liquid/particulate phase fraction. Now the lighter fraction containing less liquid and particles than the originally fed gas/liquid/particulate-mixture flows into the distribution chamber and is thus further processed by the vanes that reduce the flow velocity before the pre-separated mixture enters a tank/vessel. This is realised by diverting the direction of the inflowing pre-separated mixture by vanes (normally about 90 degrees in two horizontal directions). As the vane diffuser is now provided with a cyclone pre-separator a part of the heavier fractions (liquid and or particles) will be removed from the gas/liquid/particulate-mixture before the actual vane diffusing starts; the pre-separated gas/liquid/particulate-mixture entering the distribution chamber is lighter than it was originally when not pre-separated according the prior art. As the pre-separated gas/liquid/particulate-mixture is lighter the maximum volume the distribution chamber holding the curved vanes can handle before being overloaded increases. The increase of the capacity is even larger than this increase of the maximum volume to be handled by the distribution chamber alone. The additional capacity of the vane diffuser according the present invention also includes the (relative heavy) part of the gas/liquid/particulate-mixture flow that is removed in the first cyclone pre-separator. Another advantage of the vane diffuser according the invention is that also the level of separation (separation quality or effectiveness of separation) increases. This is among others a result of the effect that the average dimensions of the liquid particles not already pre-separated in the cyclone pre-separator will increase during pre-separation and are thus easier/better to separate during the vane diffusing step. The improved separation also leads to a reduced risk of overloading any subsequent separation means further downstream (e.g. a demister or coalescer). All these advantages are provided with a constructive simple solution that hardly requires any additional maintenance.

In a preferred embodiment the liquid phase outlet of the cyclone pre-separator is connected with a drain leading away from the vane diffuser, preferably downwards to a reservoir in the lower part of the vessel wherein the vane diffuser is allocated. The drain (or "downcomer") thus discharges the heavier pre-separated liquid/particulate-phase fraction away from the location here the gravitational vane diffusing separation takes place. The fraction led away is not influencing (disturbing) the gravitational vane diffusing separation process of which also for this reason increases the effectiveness.

In a specific embodiment a contra-swirl element is located between the gas phase outlet of the pre-separator and the distribution chamber. Such contra-swirl element realises an improvement of the equal distribution of the lighter fraction containing less liquid and particles than the originally fed gas/liquid/particulate-mixture that leaves the cyclone pre-separator before entering the distribution chamber. It is also beneficial in limiting the pressure drop over the vane diffuser according the invention.

Further improvement can be realised in case the distribution chamber and cyclone housing are combined in a single construction. A single construction is easy to attach and to loosen and also reduces the risks for leakage between the gas phase outlet of the cyclone pre-separator and the distribution chamber. It also enables the compact construction of the vane diffuser according the invention.

The sides of the curved vanes remote from the distribution chamber are directing away from the distribution chamber, e.g. radially, rectangular in relation to the axial direction of the distribution chamber or at any other way. Normally use is made of parallel vanes. Such geometry provided an effective and efficient distribution of the mixture to be separated by gravity.

The invention also comprises a separator for separating a gas/liquid/particulate-mixture flow in essentially a gas phase fraction and a liquid/particulate phase fraction, comprising: a vessel with an essentially gas phase outlet on the upper side and an essentially liquid/particulate phase outlet on the lower side; and a vane diffuser as disclosed before located between the upper and the lower side of the vessel. Normally the vessel comprises a settling zone between vane diffuser and the gas phase outlet on the upper side. In an alternative embodiment the vessel comprises an additional coalescer in the upper part of the vessel. Such separator provides the advantages as already named in relation to the vane diffuser according the present invention. Also prior art separators are simply converted to the separator according the invention by building out the prior art vane diffuser and exchanging it for the present vane diffuser. Such conversion is relatively simple to realise and requires limited investments.

Furthermore the invention also relates to a method for separating a gas/liquid/particulate-mixture flow in essentially a gas phase faction and a liquid/particulate fraction, comprising the steps: A) feeding a gas/liquid/particulate-mixture to a cyclone pre-separator; B) pre-separating the gas/liquid/particulate-mixture by centrifugal force in a pre-separated heavier essentially liquid/particulate fraction and a pre-separated lighter gas/liquid/particulate fraction; C) leading the according step B) pre-separated heavier essentially liquid/particulate fraction away to a reservoir; D) feeding the pre-separated gas/liquid/particulate-mixture to a subsequent vane diffuser; and E) subsequent separating the pre-separated gas/liquid/particulate fraction by gravitational force. It is furthermore advantageous when the lighter fractions resulting form of the separation steps B) and E) are led to a common reservoir. Preferably before feeding the pre-separated gas/liquid/particulate-mixture to a subsequent vane diffuser according step D) the rotational movement of the pre-separated gas/liquid/particulate-mixture is reduced.

BRIEF DESCRIPTION OF THE DRAWINGS

The invention is further elucidated on the basis of the non-limitative exemplary embodiments shown in the following figures. Herein.

DESCRIPTION OF THE PREFERRED EMBODIMENTS

Figure 1:
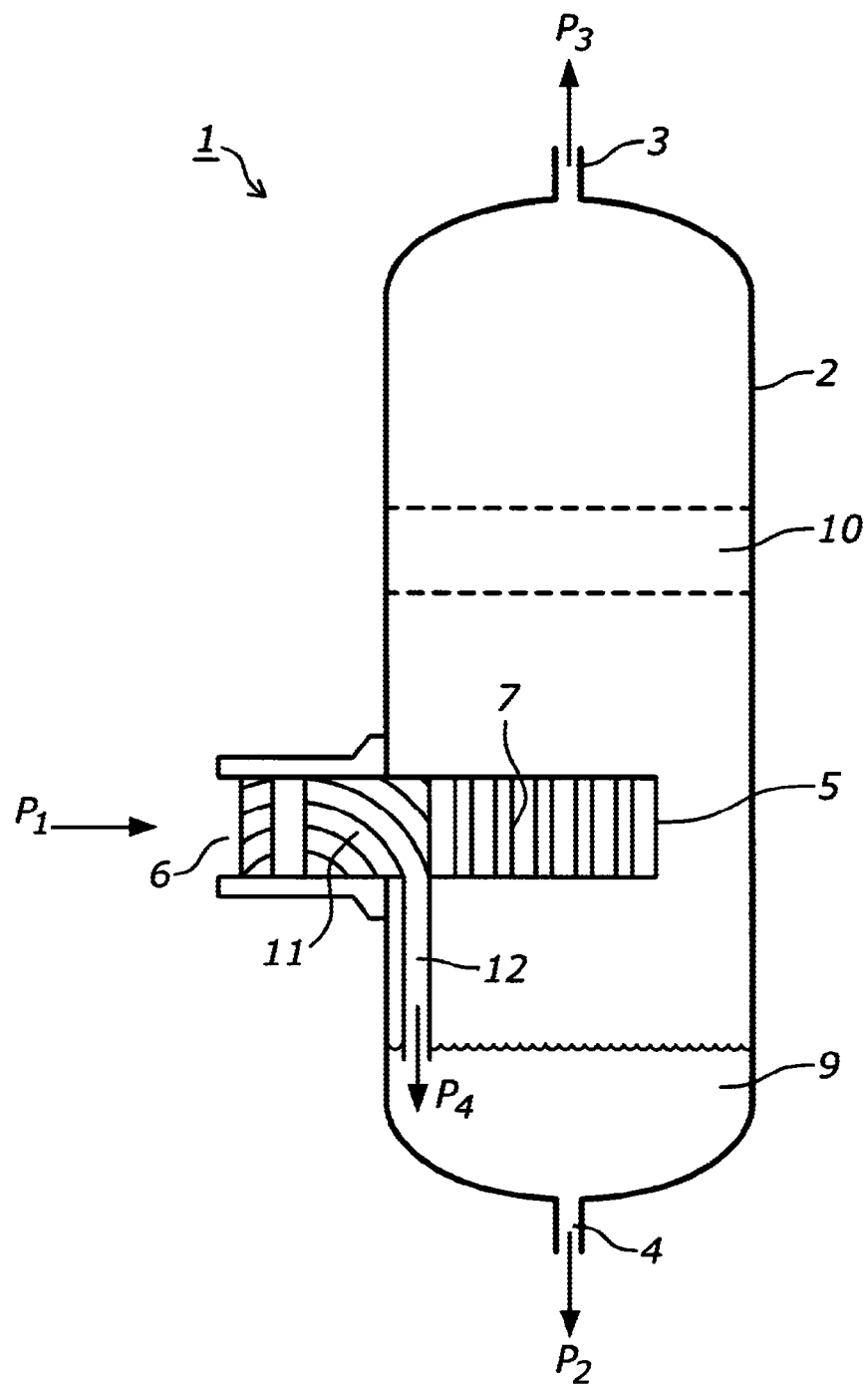
FIG. 1 shows a separator for separating a gas/liquid/particulate-mixture according the present invention with a vessel and a vane diffuser.

FIG. 1 shows a schematic cross-section through a separator 1 for separating a gas/liquid/particulate-mixture flow in essentially a gas phase fraction and a liquid/particulate phase fraction, provided with a vessel 2 with an essentially gas phase outlet 3 on the upper side and an essentially liquid/particulate phase outlet 4 on the lower side; and a vane diffuser 5 located between the upper and the lower side of the vessel 2. The gas/liquid mixture enters the vessel 2 via the inlet 6 according arrow $P_1$. The inlet 6 is connected to a distribution chamber 7 holding a plurality of curved vanes—which will be further elucidated in FIG. 2—and is opened to the inside of the vessel 2. The distribution chamber 7 disperses the gas/liquid mixture flow more or less evenly over the diameter of the vessel 2. Larger liquid particles will separate from the gas/liquid mixture and will drop down to arrive in a liquid reservoir 9. The reservoir 9 is connected to the liquid outlet 3 to drain liquid from the vessel 2 as indicated with arrow $P_2$. After entering the vessel 2 a lighter fraction of the mixture flows upward in the vessel 2 a may e.g. pass on or more coalescer elements 10 (demister equipment) that are only schematically represented in the figure. During passage of the coalescer elements 10 liquid particles in the lighter fraction of the mixture are caught and fed to the reservoir 9. Optionally also one or more additional separators (a (pack of) cyclone separator(s)) may be arranged above the coalescer elements 10 for further limiting the liquid content of the gas phase fraction. The resulting gas phase flow finally leaves the vessel 2 via a gas outlet 3, indicated with arrow $P_3$.

The vane diffuser 5 (that may also be referred to as a cyclone pre-separator) is also provided with a swirl element 11 located between the inlet 6 for the gas/liquid/particulate-mixture and the distribution chamber 7. Due to the cyclone in the gas/liquid/particulate-mixture provided by the swirl element 11 a part of the heavier fractions (liquid and or particles) will be removed from the gas/liquid/particulate-mixture before reaching the distribution chamber 7 and thus before the actual diffusing starts. The (relative heavy) part of the gas/liquid/particulate-mixture are already separated from the mixture by the swirl element 11 and removed according arrow $P_4$ through a heavy fraction discharge pipe 12 leading towards the liquid reservoir 9 of the vessel 2. The remaining pre-separated gas/liquid/particulate-mixture that enters the distribution chamber 7 is thus lighter than before it passed the swirl element 11. As the pre-separated gas/liquid/particulate-mixture is due to the swirl element 11 is thus lighter the maximum volume of mixture to be handled by the separator 1 increases.

Figure 2:
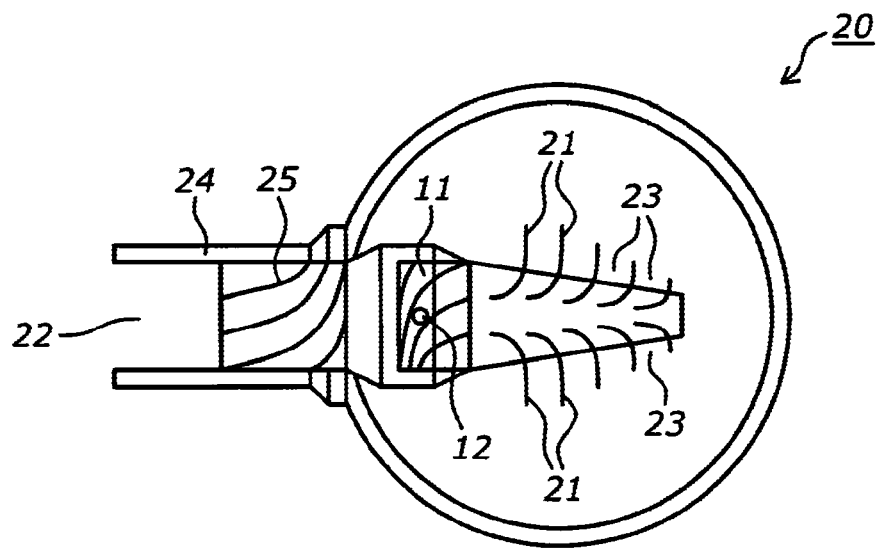
FIG. 2 shows a perspective/side/top side view of an embodiment of a vane diffuser according the present invention.

FIG. 2 shows a perspective/side/top side view of an embodiment of a vane diffuser 20 according the present invention. Corresponding components with the embodiment 1 as shown in FIG. 1 are designated with the same reference numerals. Between a top plate and a bottom plate (both not depicted in this figure) diffuser 20 is provided with a plurality of vanes 21 that together with the top and bottom plates form a plurality of curved channels for directing the flow of the mixture to distribute the mixture that enters through the inlet 6 as gently as possible into the vessel 2. A part of the droplets will settle on the pressure side of the vanes 21 due to inertial forces and leave the vane's trailing edges in the form of a liquid film.

The vane diffuser 20 is provided with a cyclone housing 24 upstream connecting to the inlet 22 for the gas/liquid/particulate-mixture; a contra-swirl element 11 for removing rotation of the gas/liquid/particulate-mixture flow being located in the cyclone housing 24 downstream of the inlet 22 for the gas/liquid/particulate-mixture; a gas phase outlet 23 between the vanes 21 opened to the vessel 2 downstream of the contra-swirl element 11; and a liquid phase outlet 12 connecting to the outer zone of the cyclone housing downstream of the contra-swirl element 11. In the cyclone housing 24 is furthermore provided an inlet swirl element 25 (also known as a vane feed inlet) that is also provided with curved blades.

Figure 3:
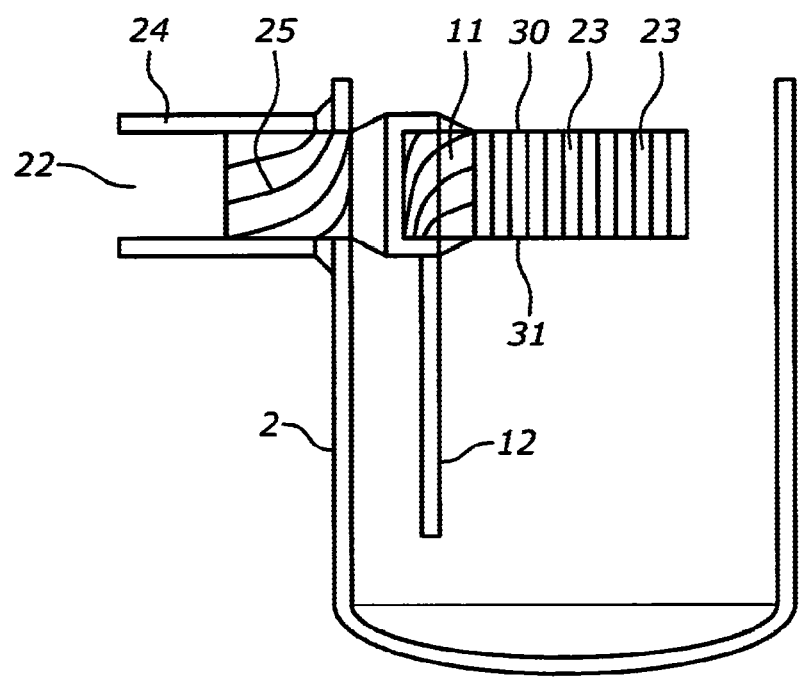
FIG. 3 shows a side view of an alternative embodiment of a vane diffuser according the present invention.

FIG. 3 shows a side view of the embodiment of the vane diffuser 20 according FIG. 2 and shows a top plate 30 and a bottom plate 31. The vanes 21 together with the top and bottom plates 30, 31 form a plurality of curved channels 23 for directing the flow. The heavy fraction (liquid) separated, additionally compared to the prior art, by the swirl element 25 is lead away by discharge pipe 12 (that is to say a drain leading away from the vane diffuser 20) downwards to the lower part of the vessel 2. The discharge pipe 12 (or "downcomer") thus discharges the heavier pre-separated liquid/particulate-phase fraction away from the location in the vessel 2 where the gravitational vane diffusing separation takes place. The fraction led away is thus not influencing (disturbing) the gravitational vane diffusing separation process.

The invention claimed is:

1. A separator for separating a gas/liquid/particulate-mixture flow into essentially a gas phase fraction and a liquid/particulate phase fraction, comprising:
 a vessel with an essentially gas phase outlet on an upper side and an essentially liquid/particulate phase outlet on a lower side; and
 a vane diffuser disposed through a sidewall of the vessel between the upper side and the lower side of the vessel, wherein the vane diffuser comprises:
  a distribution chamber comprising side walls and a plurality of curved vanes lancing the side walls, the side walls being provided with passages between the plurality of curved vanes connecting an interior of the distribution chamber with an exterior of the distribution chamber;
  an inlet for the gas/liquid/particulate-mixture flow connecting to the distribution chamber;
  a cyclone pre-separator located between the inlet for the gas/liquid/particulate-mixture flow and the distribution chamber, which cyclone pre-separator comprises:
   a cyclone housing upstream connecting to the inlet for the gas/liquid/particulate-mixture flow;
   a swirl element for rotation of the gas/liquid/particulate-mixture flow being located in a portion of the cyclone housing outside of the vessel and downstream of the inlet for the gas/liquid/particulate-mixture flow; and
   a gas phase outlet opened to the distribution chamber downstream of the swirl element;
  a contra-swirl element positioned within the vessel between the gas phase outlet of the cyclone pre-separator and the distribution chamber; and
  a liquid phase outlet connected to a portion of the cyclone pre-separator surrounding the contra-swirl element.

2. The separator as claimed in claim 1, wherein the vessel comprises a settling zone between the vane diffuser and the essentially gas phase outlet on the upper side.

3. The separator as claimed in claim 1, wherein the vessel comprises an additional coalescer in an upper part of the vessel.

4. The separator as claimed in claim 1, wherein the liquid phase outlet of the cyclone pre-separator is provided in a part where the contra-swirl element is positioned.

5. The separator as claimed in claim 1, wherein sides of the plurality of curved vanes remote from the distribution chamber are directed away from the distribution chamber such that a part of the liquid phase fraction leaves trailing edges of the curved vanes in the form of a liquid film.

6. The separator as claimed in claim 1, wherein sides of the plurality of curved vanes remote from the distribution chamber are directed away from the distribution chamber.

7. The separator as claimed in claim 1, wherein the liquid phase outlet of the cyclone pre-separator is connected with a drain leading away from the vane diffuser.

8. The separator as claimed in claim 7, wherein liquid phase outlet of the cyclone pre-separator drains into the vessel.

9. The separator as claimed in claim 1, wherein the liquid phase outlet of the vane diffuser is positioned within the vessel directly below the contra-swirl element.

10. The separator as claimed in claim 1, wherein liquid phase outlet of the cyclone pre-separator drains into the vessel.

* * * * *